(12) United States Patent  (10) Patent No.: US 8,512,438 B2
Bhatia et al.  (45) Date of Patent: Aug. 20, 2013

(54) METHODS FOR CONTROLLING METAL NANOSTRUCTURES MORPHOLOGY

(75) Inventors: Rimple Bhatia, Los Altos, CA (US);
Jelena Sepa, Sunnyvale, CA (US);
Frank Wallace, San Francisco, CA (US)

(73) Assignee: Cambrios Technologies Corporation, Sunnyvale, CA (US)

( * ) Notice: Subject to any disclaimer, the term of this patent is extended or adjusted under 35 U.S.C. 154(b) by 248 days.

(21) Appl. No.: 12/868,511

(22) Filed: Aug. 25, 2010

(65) Prior Publication Data

US 2011/0048170 A1 Mar. 3, 2011

Related U.S. Application Data

(60) Provisional application No. 61/275,093, filed on Aug. 25, 2009.

(51) Int. Cl.
*B22F 9/24* (2006.01)
*B82Y 40/00* (2011.01)

(52) U.S. Cl.
USPC .......................... 75/371; 75/741; 977/896

(58) Field of Classification Search
None
See application file for complete search history.

(56) References Cited

U.S. PATENT DOCUMENTS

| | | | |
|---|---|---|---|
| 3,167,429 A | 1/1965 | Levy | 96/61 |
| 3,552,969 A | 1/1971 | Henn et al. | 96/66 |
| 4,486,350 A | 12/1984 | Bauer et al. | 260/245.86 |
| 4,539,041 A | 9/1985 | Figlarz et al. | 75/0.5 A |
| 5,565,143 A | 10/1996 | Chan | 252/514 |
| 6,597,947 B1 | 7/2003 | Inoue et al. | 604/20 |
| 7,048,806 B2 | 5/2006 | Ochomogo et al. | 134/34 |
| 8,269,214 B2 * | 9/2012 | Smigelski et al. | 257/40 |
| 2005/0056118 A1 | 3/2005 | Xia et al. | 75/330 |
| 2007/0034052 A1 | 2/2007 | Vanheusden et al. | 75/362 |
| 2007/0074316 A1 | 3/2007 | Alden et al. | 977/762 |
| 2007/0160647 A1 | 7/2007 | Pritchard et al. | 424/423 |
| 2008/0003130 A1 | 1/2008 | Xia et al. | 420/501 |
| 2008/0143906 A1 | 6/2008 | Allemand et al. | 349/43 |
| 2008/0210052 A1 | 9/2008 | Allemand et al. | 75/300 |
| 2008/0229612 A1 | 9/2008 | Sommer et al. | 36/44 |
| 2008/0259262 A1 | 10/2008 | Jones et al. | 349/139 |
| 2009/0052029 A1 | 2/2009 | Dai et al. | 359/486 |
| 2009/0098405 A1 * | 4/2009 | Matsunami | 428/606 |
| 2009/0130433 A1 * | 5/2009 | Takada | 428/328 |
| 2009/0196788 A1 * | 8/2009 | Wang et al. | 420/501 |
| 2009/0228131 A1 | 9/2009 | Wolk et al. | 700/103 |

(Continued)

FOREIGN PATENT DOCUMENTS

| | | |
|---|---|---|
| EP | 1 623 954 A1 | 2/2006 |
| JP | 2008-190006 A | 8/2008 |
| WO | WO 2009/017852 A2 | 2/2009 |

OTHER PUBLICATIONS

Ducamp-Sanguesa et al., "Synthesis and Characterization of Fine and Monodisperse Silver Particles of Uniform Shape," *Journal of Solid State Chemistry*, 100: 272-280, 1992.

(Continued)

*Primary Examiner* — George Wyszomierski
(74) *Attorney, Agent, or Firm* — Seed IP Law Group PLLC

(57) ABSTRACT

Described herein are methods of controlling metal nanowire morphologies by adjusting the reaction conditions of a polyol synthesis. In particular, by purging the reaction with an inert gas, batch-to-batch consistency can be achieved.

13 Claims, 11 Drawing Sheets

(56) References Cited

U.S. PATENT DOCUMENTS

| | | | | |
|---|---|---|---|---|
| 2009/0242231 | A1 | 10/2009 | Miyagisima et al. | 174/68.1 |
| 2009/0321113 | A1 | 12/2009 | Allemand et al. | 174/257 |
| 2010/0034693 | A1 | 2/2010 | Li | 420/501 |
| 2010/0307792 | A1 | 12/2010 | Allemand et al. | 174/126.1 |
| 2011/0024159 | A1 | 2/2011 | Allemand et al. | 174/126.1 |

OTHER PUBLICATIONS

Filankembo et al., "Is the Anion the Major Parameter in the Shape Control of Nanocrystals?," *Journal of Physical Chemistry*, 107: 7492-7500, 2003.

Jana et al., "Wet chemical synthesis of silver nanorods and nanowires of controllable aspect ratio," *Chemical Communications*: 617-618, 2001.

Kim et al., "Platonic Gold Nanocrystals," *Angewandte Chemie*, 116: 3759-3763, 2004.

Nikoobakht et al., "Preparation and Growth Mechanism of Gold Nanorods (NRs) Using Seed-Mediated Growth Method," *Chem. Mater.*, 15: 1957-1962, 2003.

Silvert et al., "Preparation of colloidal silver dispersions by the polyol process Part 1—Synthesis and characterization," *J. Mater. Chem.*, 6 (4): 573-577, 1996.

Silvert et al., "Preparation of colloidal silver dispersions by the polyol process Part 2—Mechanism of particle formation," *J. Mater. Chem.* 7 (2): 303-309, 1997.

Sun et al., "Crystalline Silver Nanowires by Soft Solution Processing," *Nano Letters*, 2 (2): 165-168, 2002.

Sun et al., "Large-Scale Synthesis of Uniform Silver Nanowires Through a Soft, Self-Seeding, Polyol Process," *Adv. Mater.*, 14 (11): 833-837, 2002.

Sun et al., "Uniform Silver Nanowires Synthesis by Reducing $AgNO_3$ with Ethylene Glycol in the Presence of Seeds and Poly (Vinyl Pyrrolidone)," *Chem. Mater.*, 14: 4736-4745, 2002.

Sun et al., "Shape-Controlled Synthesis of Gold and Silver Nanoparticles," *Science*, 298 (5601): 2176-2179, 2002.

Wiley et al., "Polyol Synthesis of Silver Nanoparticles: Use of Chloride and Oxygen to Promote the Formation of Single-Crystal, Truncated Cubes and Tetrahedrons," *Nano Letters*, 4 (9): 1733-1739, 2004.

Wiley et al., "Polyol Synthesis of Silver Nanostructures: Control of Product Morphology with Fe (II) or Fe (III) Species," *Langmuir*, 21 (18): 8077-8080, 2005.

Yang et al., "Anisotropic syntheses of boat-shaped core-shell Au-Ag nanocrystals and nanowires," *Nanotechnology 17*: 2304-2310, 2006.

Chang Chen et al., "The influence of seeding conditions and shielding gas atmosphere on the synthesis of silver nanowires through the polyol process," *Nanotechnology 17*:466-174, 2006.

Xinling Tang et al., "Rapid and high-yield synthesis of silver nanowires using air-assisted polyol method with chloride ions," *Colloids and surfaces A: Physicochemical and Engineering Aspects*, 338:33-39, 2009.

Advanced Nano Products, "Nano silver ink for ink jet printing," (Jun. 2, 2009 via Internet Wayback Machine), http://www.anapro.com/english/product/nano_silver.asp.

International Search Report and Written Opinion mailed Aug. 10, 2010, for PCT/US2010/033618, filed May 4, 2010 (14 pages).

Okada et al., "Development of Fine Circuit Pattern Formation Process Using Nano-Metal Ink," *SEI Technical Review 62*: 54-57, Jun. 2006.

Sun et al., "Polyol Synthesis of Uniform Silver Nanowires: A Plausible Growth Mechanism and the Supporting Evidence," *Nano Letters 3*(7): 955-960, 2003.

Sun et al., "Template-Engaged Replacement Reaction: A One-step Approach to the Large-Scale Synthesis of Metal Nanostructures with Hollow Interiors," *Nano Letters* 2(5): 481-485, 2002.

ULVAC Materials Division Inc., "Nano-metal Ink" (Apr. 7, 2011), http ://www.ulvac.co.jp/eng/products/materials/nanoparticle-technology.html.

ULVAC Materials Division Inc., Establishment of the World's First Consortium for the Development and Commercialization of Next-Generation Functional Circuit Boards Using Nano Paste (Oct. 23, 2002), http://www.ulvac.co.jp/eng/information/news/2002/20021023.html.

Wiley et al., "Polyol Synthesis of Silver Nanoparticles: Use of Chloride and Oxygen to Promote the Formation of Single-Crystal, Truncated Cubes and Tetrahedrons," *Nano Letters* 4(10): 2057, 2004 [correction to 4(9): 1733-1739, 2004].

\* cited by examiner

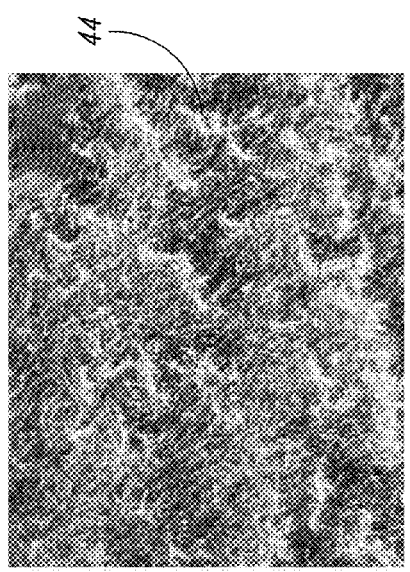
*FIG. 5C*  9 Min
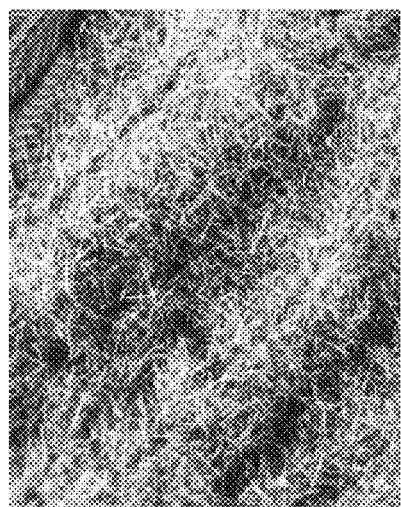
*FIG. 5F*  20 Min
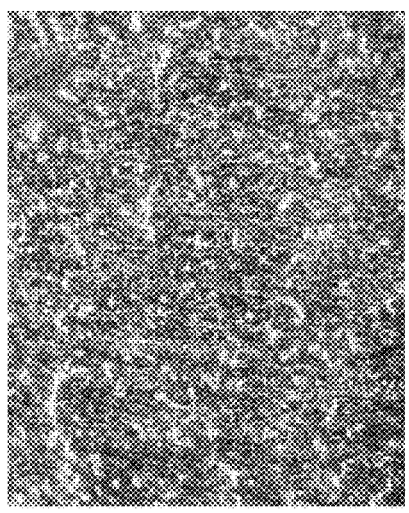
*FIG. 5B*  8 Min
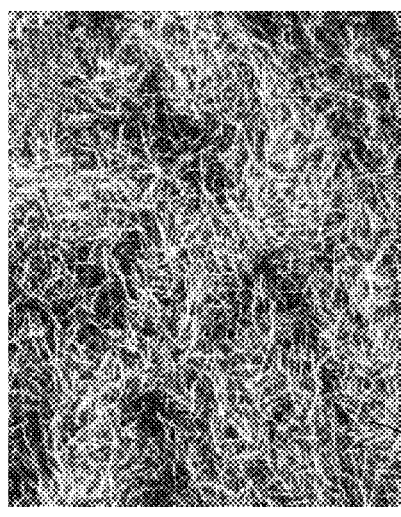
*FIG. 5E*  15 Min
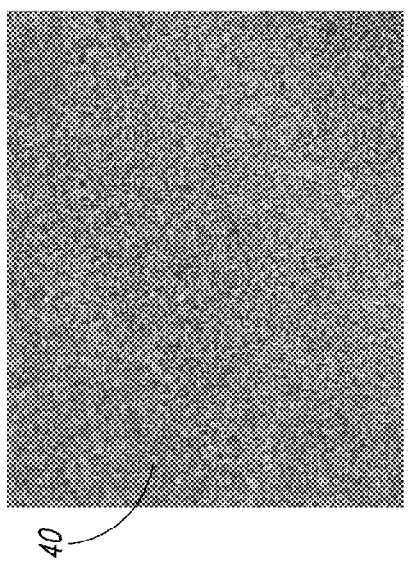
*FIG. 5A*  7 Min
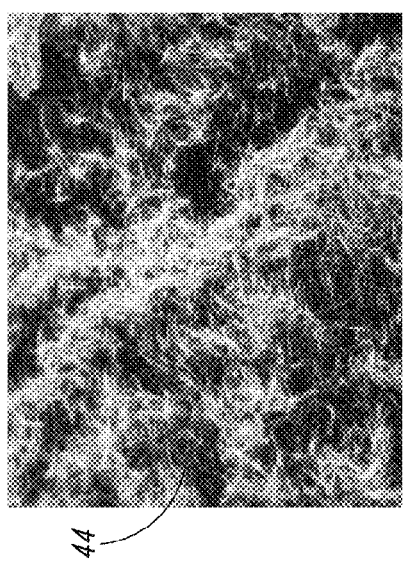
*FIG. 5D*  10 Min ated herein
METHODS FOR CONTROLLING METAL NANOSTRUCTURES MORPHOLOGY

CROSS-REFERENCE TO RELATED APPLICATION

This application claims the benefit under 35 U.S.C. §119(e) of U.S. Provisional Patent Application No. 61/275,093 filed Aug. 25, 2009, which application is incorporby reference in its entirety.

BACKGROUND

This application is related to methods of preparing metal nanowires in a solution-based synthesis while controlling the yield and morphology of the same.

DESCRIPTION OF THE RELATED ART

Nano-sized materials (or nanomaterials) can differ markedly from their analogous bulk materials. In particular, the physical and chemical properties of nanomaterials correlate strongly with their size, shape and morphology. As a result, material scientists have focused their efforts on developing simple and effective methods for fabricating nanomaterials with controllable morphology (including shapes and sizes), hence tailoring their properties.

A solution-based synthesis (also referred to as the "polyol" synthesis) is reasonably effective in large-scale production of metal nanostructures. See, e.g., Sun, Y. et al., (2002) *Science*, 298, 2176; Sun, Y. et al., (2002) *Nano Lett.* 2, 165; Sun, Y. et al., (2002) *Adv. Mater.* 14, 833; Kim, F. et al., (2004) *Angew. Chem. Int. Ed.* 116, 3759; and U.S. Published Application 2005/0056118. The poly synthesis involves the reduction of a precursor (e.g., a metal salt) of the metal nanostructure by a polyol (e.g., ethylene glycol) in the presence of poly(vinyl pyrrolidone) ("PVP"). Typically, the reduction is carried out at a temperature of no more than 200° C. The polyol typically serves dual functions as a solvent and a reducing agent. Typically, the morphologies (including the shapes and sizes) of the nanostructures formed are influenced by parameters including relative amounts of PVP and the metal salt, concentrations of PVP and the metal salt, reaction time, and reaction temperature.

According to this method, metal nanostructures of various morphologies, including nanocubes, nanowires, nanopyramids and multi-ply twinned particles, have been obtained. However, a common problem of the poly synthesis is that a mixture of nanostructures of several shapes is produced. The problem is compounded by poor reproducibility of the process, which is likely caused by trace amounts of contaminants in the constituents of the synthesis. See, e.g., Wiley, B. et al., (2004) *Nano Lett.* 4(9), 1733-1739.

The poly synthesis has been modified in efforts to form nanostructures of uniform shapes and sizes. For example, adding a trace amount of chloride to the "polyol" process created single crystal truncated cubes and tetrahedrons. See, e.g., Wiley, B. et al., (2004) *Nano Lett.* 4(9), 1733-1739. Using a seed material (e.g., platinum or silver nanoparticles) in the "polyol" process generated uniform silver nanowires of high aspect ratio (about 1000). Sun, Y. et al. (2002) *Chem. Mater.* 14, 4736-4745. However, the problem of producing mixed nanostructures (e.g., the silver nanowires were accompanied by the formation of silver nanoparticles) persists in the existing methods. Additional separation steps are therefore necessary to obtain monodispersed nanostructures.

There remains a need in the art to fabricate nanostructures with controllable shapes and sizes in an effective and reproducible fashion.

BRIEF SUMMARY

Described herein are methods of controlling metal nanowire morphologies by adjusting the reaction conditions of a polyol synthesis. In particular, by purging the reaction with an inert gas, batch-to-batch consistency can be achieved.

One embodiment provides a method of preparing metal nanowires, which comprises:

(a) providing a first reaction mixture by combining a polyol solvent, a capping reagent, and an ionic additive in a reaction vessel;

(b) purging the first reaction mixture with an inert gas for a purging time;

(c) after (b), providing a second reaction mixture by combining the first reaction mixture with a metal salt; and (d) providing a plurality of metal nanostructures by reducing the metal salt, wherein the plurality of metal nanostructures comprise metal nanowires at a first yield.

In some embodiments, the method comprises heating the first reaction mixture to a predetermined reaction temperature prior to (b).

In certain embodiments, purging the first reaction mixture includes purging the reaction vessel and forming a blanket of inert gas above a top surface of the first reaction mixture. In other embodiments, purging the first reaction mixture includes sparging the first reaction mixture (i.e., directly injecting the inert gas into the first reaction mixture.)

In various embodiments, providing the plurality of metal nanostructures includes reducing the metal salt while purging the second reaction mixture.

In certain embodiments, the polyol solvent is ethylene glycol, 1,2-propylene glycol, 1,3-propylene glycol, or glycerol, the capping reagent is poly(vinylpyrrolidone), the ionic additive provides a chloride ion (e.g., tetraalkylammonium chloride).

In a preferred embodiment, the metal salt is a silver salt and the metal nanowires are silver nanowires. In other embodiments, the plurality of metal nanostructures produced by the claimed method includes at least 80% of metal nanowires.

In various embodiments, adjusting the purging time results in different morphologies of the metal nanostructures, and/or a different yield of the metal nanowires.

A further embodiment provides a method comprising:

(a) providing a first plurality of metal nanowires having a target mean length, a target mean diameter, or a target yield, wherein the first plurality of metal nanowires are prepared in a first polyol solvent by a first polyol synthesis that includes purging with an inert gas for a first purging period, and wherein the first polyol solvent is provided from a first manufacturer lot;

(b) providing a second plurality of metal nanowires having the target mean length, the target mean diameter, or the target yield, wherein the second plurality of metal nanowires are prepared in a second polyol solvent by a second polyol synthesis that includes purging with an inert gas for a second purging period, and wherein the second polyol solvent is chemically identical to the first polyol solvent and is provided from a second manufacturer lot, wherein the first purging period differs from the second purging period.

In various embodiments, the first polyol synthesis and the second polyol synthesis are otherwise carried out in substantially the same conditions.

In certain embodiments, providing the second plurality of metal nanowires having the target mean length, the target mean diameter, or the target yield includes selecting the second purging period by running one or more test polyol syntheses in the second polyol solvent; providing a mean length, a mean width or a yield for respective resulting metal nanowires of each test polyol synthesis; and identifying the second purging period as corresponding to the test polyol synthesis that produces metal nanowires having the target mean length, target mean width or the target yield.

In certain specific embodiments, the first polyol synthesis is of a smaller reaction scale than that of the second polyol synthesis.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been selected solely for ease of recognition in the drawings.

FIGS. 5A-5F show a progression of the nanowire formation at different reaction times.

DETAILED DESCRIPTION OF THE INVENTION

Figure 1A:
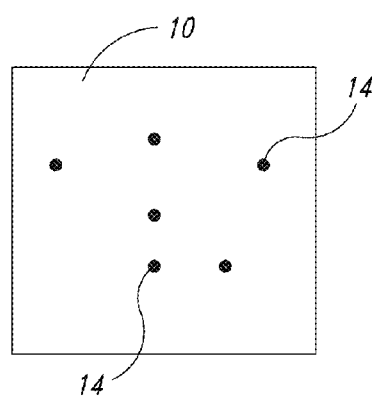
FIGS. 1A-1C illustrate schematically the nucleation and growth of nanostructures of different morphologies in a poly synthesis.

Provided herein are methods of controlling nanostructure morphologies when produced in a polyol synthesis. In particular, various embodiments provide methods of producing nanowires at high yields with batch-to-batch consistency.

Nanostructure Morphologies

Provided herein is a method for isolating and purifying nanostructures of certain morphologies from a mixture of nanostructures of various morphologies. In particular, substantially all of the purified metal nanostructures have aspect ratios of 10 or more.

As used herein, "conductive nanostructures" or "nanostructures" generally refer to electrically conductive nano-sized structures, at least one dimension of which is less than 500 nm, more preferably, less than 250 nm, 100 nm, 50 nm, or 25 nm. Typically, the nanostructures are made of a metallic material, such as an elemental metal (e.g., transition metals) or a metal compound (e.g., metal oxide). The metallic material can also be a bimetallic material or a metal alloy, which comprises two or more types of metal. Suitable metals include, but are not limited to, silver, gold, copper, nickel, gold-plated silver, platinum, and palladium.

The nanostructures can be of any shape or geometry. The morphology of a given nanostructure can be defined in a simplified fashion by its aspect ratio, which is the ratio of the length over the diameter of the nanostructure. For instance, certain nanostructures are isotropically shaped (i.e., aspect ratio=1). Typical isotropic nanostructures include nanoparticles. In preferred embodiments, the nanostructures are anisotropically shaped (i.e., aspect ratio≠1). The anisotropic nanostructure typically has a longitudinal axis along its length. Exemplary anisotropic nanostructures include nanowires, nanorods, and nanotubes, as defined herein.

The nanostructures can be solid or hollow. Solid nanostructures include, for example, nanoparticles, nanorods and nanowires. "Nanowires" typically refers to long, thin nanostructures having aspect ratios of greater than 10, preferably greater than 50, and more preferably greater than 100. Typically, the nanowires are more than 500 nm, more than 1 µm, or more than 10 µm long. "Nanorods" are typically short and wide anisotropic nanostructures that have aspect ratios of no more than 10.

Hollow nanostructures include, for example, nanotubes. Typically, the nanotube has an aspect ratio (length:diameter) of greater than 10, preferably greater than 50, and more preferably greater than 100. Typically, the nanotubes are more than 500 nm, more than 1 µm, or more than 10 µm in length.

Nanostructures of higher aspect ratio (e.g., nanowires) are particularly favored over nanostructures of lower aspect ratio (no more than 10) because the longer the nanostructures, the fewer needed to achieve a target conductivity. Fewer nanostructures in a conductive film also leads to higher optical transparency and lower haze, both parameters finding a broad range of applications in display technology. Moreover, the width of nanowires also directly affects film conductivity, namely, at a given loading level of metal, the thinner the nanowires, the less conductive is the resulting film.

Conductive networks of nanowires are optically transparent because nanowires comprise a very small fraction of the film. In particular, the length and width of nanowires will affect the optical transparency and light diffusion (haze) of the resulting transparent conductor films because nanowires absorb and scatter light. To form a transparent conductor in which nanostructures form a conductive network, it may be desirable to reduce the amount of nanostructures that have lower aspect ratio than that of nanowires because the low aspect ratio nanostructures may not effectively contribute to conductivity, and their presence may contribute to haze. As used herein, "low aspect ratio nanostructures" includes, for example, nanostructures that are relatively wide and/or short (e.g., nanoparticles, nanorods), and have a relatively small aspect ratio (<10). Some or all of these low aspect ratio nanostructures may be seen as "bright objects" in a conductive film due to their bright appearance on dark field micrographs. The bright objects may, thus, significantly increase the haze of the conductive film.

Standard Polyol Synthesis and Modification by Adding Chloride Ions

Figure 1B:
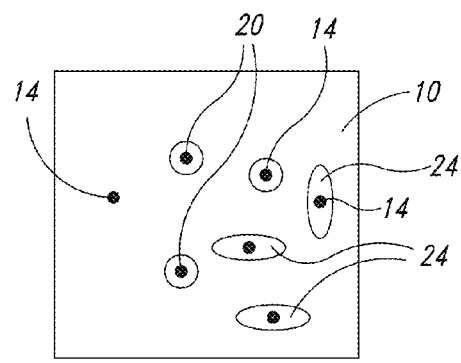
Figure 1C:
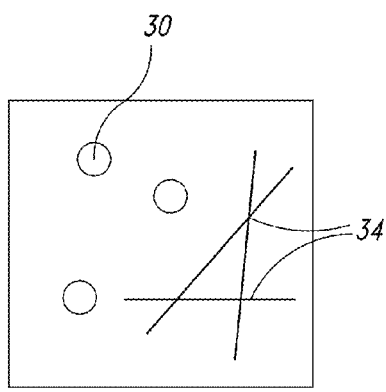
Figure 2:
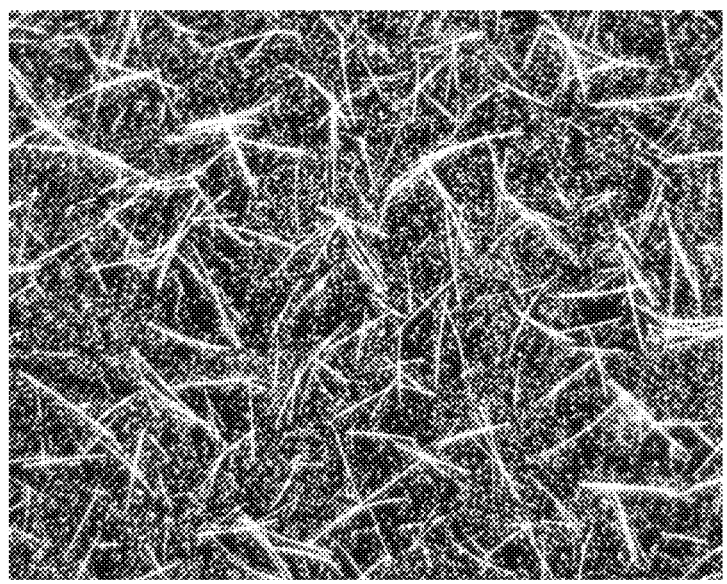
FIG. 2 shows the reaction products of mixed nanowires and nanoparticles according to a standard poly synthesis.

FIGS. 1A-1C schematically illustrate the formation of nanostructures in a standard polyol synthesis. At an initial stage (FIG. 1A), a metal salt is reduced to elemental metal atoms by a polyol solvent (e.g., ethylene glycol) in a solution phase 10. In general, the metal atoms initially form small particulate seeds 14 through a homogeneous nucleation process. These particulate seeds typically have diameters in the range of 1-5 nm. Some of these seeds proceed to grow in the solution phase 10 into isotropic nanostructures 20, which result from a growth that progresses indiscriminately in all dimensions. In contrast, some seeds grow into anisotropic nanostructures 24, which result from a preferential growth along a lateral dimension. As shown in FIG. 1C, the isotropic nanostructures 20 and anisotropic nanostructures 24 continue to grow into larger structures while maintaining their basic morphologies. Nanoparticles 30 and nanowires 34 are obtained. It is noted that during the growth process, smaller particles are less stable and typically spontaneously dissolve and contribute to the growth of the larger particles. See, e.g., U.S. Published Patent Application No. 2005/0056118, Although reaction conditions such as the reaction time and temperature can be adjusted to bias the formation of the nanowires, the standard polyol process fails to produce uniform nanowires in satisfactory yields. FIG. 2 is an image of the reaction products of a standard polyol process using silver nitrate as the precursor. As shown, both nanowires and nanoparticles are present.

The addition of a suitable ionic additive (e.g., tetrabutylammonium chloride), which provide a chloride ion to the above reaction mixture, was found to increase the yield and monodispersity of the resulting nanowires. This modified poly synthesis is described in more detail in applicants' co-owned and co-pending U.S. patent application Ser. No. 11/766,552, which application is incorporated herein in its entirety.

As used herein, "metal salt" refers to a neutral compound having a positively charged metal ion and a negatively charged counterion. The counterion may be inorganic or organic. Exemplary metal salts include, without limitation: silver nitrate ($AgNO_3$), silver acetate (($CH_3COO)_2Ag$), silver perchlorate ($AgClO_4$), gold perchlorate ($Au(ClO_4)_3$), palladium chloride ($PdCl_2$), platinum chloride ($PtCl_2$), and the like. Typically, the metal salt is soluble in the reducing solvent (e.g. ethylene glycol) and dissociates into oppositely charged metal ion and counterion. Typically, the solubility of the metal salt in the reducing solvent is at least 0.001 g/ml, at least 0.05 g/ml, or at least 0.1 g/ml.

Reduction of the metal salt in the above reaction mixture produces corresponding elemental metal. The elemental metal crystallizes or grows into a one-dimensional nanostructure (i.e. nanowires). Suitable metal nanowires therefore include, without limitation, silver, gold, copper, nickel, palladium, platinum, and gold-plated silver nanowires.

Figure 3:
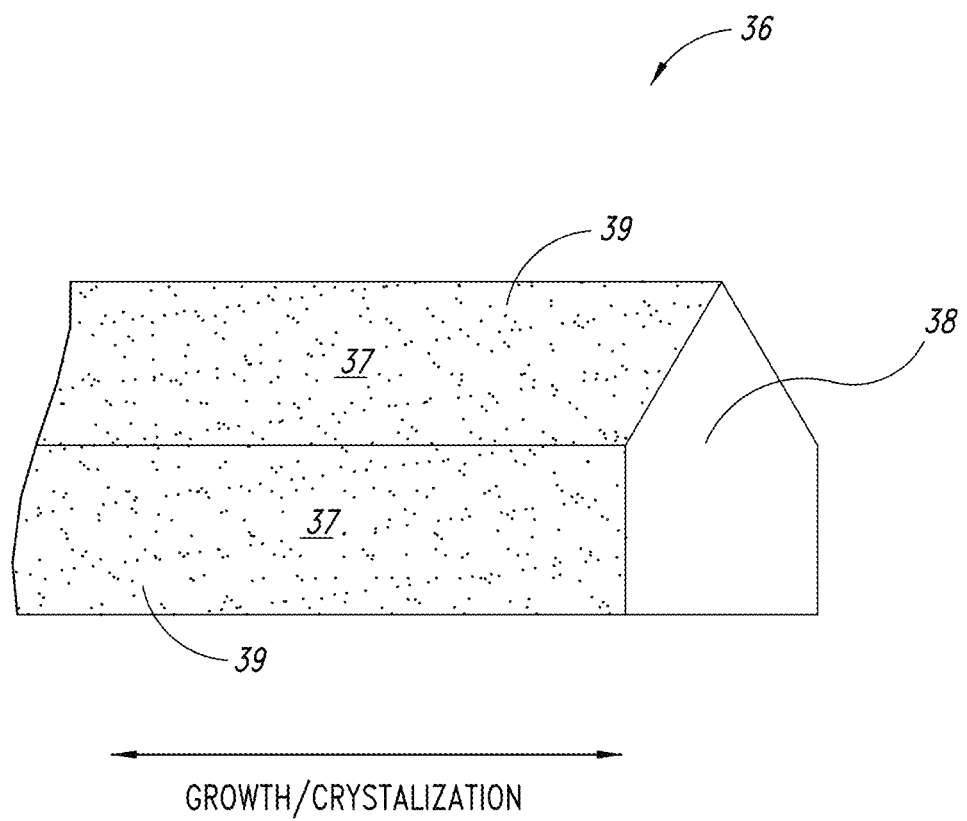
FIG. 3 schematically illustrates a one-dimensional growth of a nanowire with the assistance of a capping agent.

"Capping agent" refers to a chemical agent that preferentially interacts and adheres to a lateral surface of a growth nanowire such that the capping agent confines the lateral surface from growing and encourages a cross-section surface of the nanowire to crystallize. FIG. 3 schematically illustrates a one-dimensional growth of the growing nanowire 36. The growing nanowire 36 includes the lateral surface 37 and the cross-section surface 38. The capping agent 39 interacts with the lateral surface 36 more strongly than it does with the cross-section surface 38. The lateral surface 36 is thus passivated while the cross-section surface 38 is available for further crystallization to produce the nanowire. Examples of the capping agent include, without limitation, poly(vinyl pyrrolidone), polyarylamide, polyacrylic, and any of the copolymers thereof.

"Reducing solvent" refers to a polar solvent in which the metal salt, the ionic additive and the capping agent are soluble. In addition, the reducing solvent functions as a reducing agent to transform the metal salt to its corresponding elemental metal. Typically, the reducing solvent is a chemical reagent comprising at least two hydroxyl groups. Examples of the reducing solvents include, without limitation, diols, polyols, glycols, or mixtures thereof. More specifically, the reducing solvent can be, for example, ethylene glycol, 1,2-propylene glycol, 1,3-propylene glycol, glycerin, glycerol, and glucose.

"Ionic additive" refers to a salt additive comprising a cation and an anion. The cation and anion are associated by ionic interaction and dissociate in polar solvents such as water, alcohol, diols and polyols (including ethylene glycol, 1,2-propylene glycol, 1,3-propylene glycol, glycerin, glycerol, and glucose). The cation can be organic or inorganic. The anions are typically inorganic. Exemplary anions include halides ($Cl^-$, $Br^-$, $I^-$, $F^-$), phosphate ($PO_4^{3-}$), sulfate ($SO_4^{2-}$), hydrogen sulfate ($HSO_4^-$), aryl and alkyl sulfonates ($RSO_3^-$), and the like. The ionic additive may further include its corresponding acids, i.e., the cation is a proton.

In certain embodiments, the ionic additive is a quaternary ammonium chloride. As used herein, "quaternary ammonium chloride" refers to ammonium chloride ($NH_4^+Cl^-$) in which all four hydrogens have been replaced by an organic group. Thus, the quaternary ammonium chloride can be typically represented by formula $NR_4^+Cl^-$, wherein each R is the same or different and independently an alkyl, alkenyl, alkynyl, aryl, or aralkyl.

"Alkyl" refers to monovalent saturated hydrocarbon structure of between 1 and 20 carbons, in which the carbons are arranged in either a linear or branched manner. Lower alkyl refers to alkyl groups of 1 to 5 carbon atoms. Examples of lower alkyl groups include methyl, ethyl, propyl, isopropyl, butyl, s- and t-butyl and the like. Examples of alkyl groups of longer chains include octyl ($C_8$), decyl ($C_{10}$), dodecyl ($C_{12}$), cetyl ($C_{16}$), and the like. When an alkyl residue having a specific number of carbons is named, all geometric isomers having that number of carbons are contemplated; thus, for example, "butyl" is meant to include n-butyl, sec-butyl, isobutyl and t-butyl; propyl includes n-propyl and isopropyl.

Unless specified otherwise, the alkyl can be optionally substituted with a halogen (F, Br, Cl or I), alkoxy, amine, and the like.

"Alkenyl" refers to a monovalent hydrocarbon structure of between 2 and 20 carbon atoms with at least one double bond. Examples include, without limitation: ethenyl, propenyl, butenyl, pentenyl, hexenyl, butadienyl, pentadienyl, and the like. Unless specified otherwise, the alkyl can be optionally substituted with a halogen (F, Br, Cl or I), alkoxy, amine, or the like.

"Alkynyl" refers to a monovalent hydrocarbon structure of between 2 and 20 carbon atoms with at least one triple bond. Examples include, without limitation: ethynyl, propynyl, butynyl, pentynyl, hexynyl, methylpropynyl, 4-methyl-1-butynyl, 4-propyl-2-pentynyl, and the like.

"Alkoxy" refers to a radical of the formula —O-alkyl. Examples include methoxy, ethoxy, propoxy, isopropoxy, and the like. Lower-alkoxy refers to groups containing one to five carbons.

"Aryl" refers to optionally substituted phenyl or naphthyl. Exemplary substituents for aryl include one or more of halogen, hydroxy, alkoxy, amino, mercapto, or the like.

"Aralkyl" refers to an alkyl residue substituted with at least an aryl group. The aralkyl can be typically represented by the formula aryl-alkyl-. Exemplary aralkyls include, without limitation, phenylmethyl (i.e., benzyl), or phenylethyl group.

Exemplary ionic additives therefore include, without limitation: tetramethylammonium chloride (TMAC), tetrabutylammonium chloride (TBAC), cetyl trimethylammonium chloride (CTAC), $C_8$-$C_{18}$ alkyl dimethyl benzyl ammonium chloride, methyl trioctylammonium chloride (i.e., Aliquat 336®), and the like.

Quaternary ammonium ions ($NR_4^+$) are permanently charged cations that typically are not influenced by the pH of their environment. They are soluble in the reducing solvent, as defined herein. Moreover, they are compatible with the capping agent (e.g., PVP and its copolymers) due to the organic moieties present.

The quaternary ammonium ions differ from inorganic cations in their effects on the formation of silver nanowires in the modified polyol process. More specifically, the presence of a quaternary ammonium-based ionic additive encourages a predominantly anisotropic growth of nanostructures to produce nanowires in relatively high yield and relatively high monodispersity.

FIGS. 4A-4D show images of silver nanowire formations using various chloride-based ionic additives, including HCl, $ZnCl_2$, $MgCl_2$, and TBAC, respectively. All the reactions were carried out by initially mixing 0.1M $AgNO_3$, 0.15M PVP and 0.001M of the chlorides at room temperature (25° C. to 40° C.). The reaction mixture was then heated to about 160° C. Typically, nanostructures (nanowires and/or nanoparticles) were formed rapidly after a brief induction period (10-30 minutes). The products were collected after about 30 minutes.

Figure 4B:
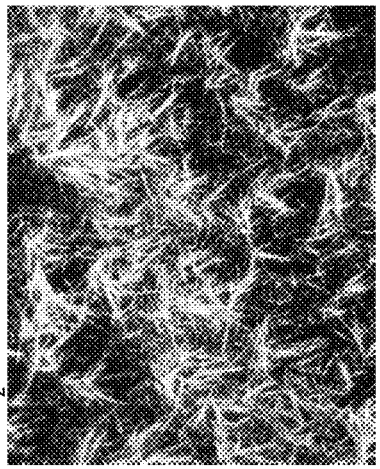
FIGS. 4A-4D illustrate various embodiments in which various chloride additives are used in modified poly syntheses.
Figure 4D:
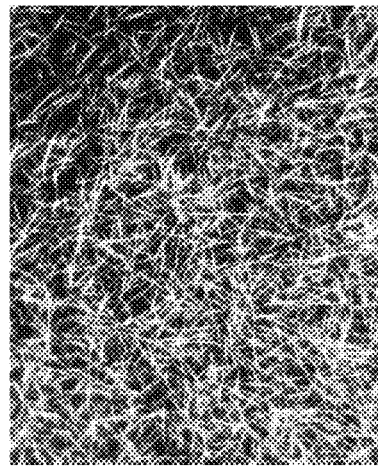
Figure 4A:
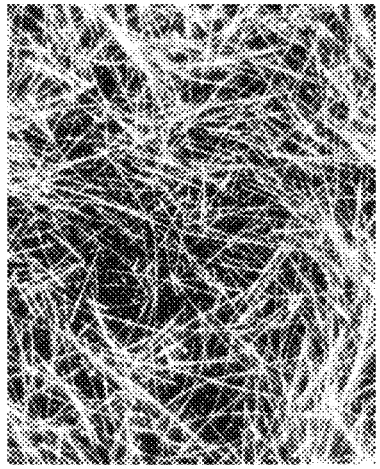
Figure 4C:
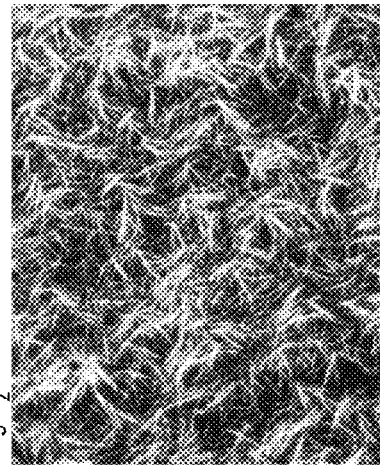

FIGS. 4A-4C show that silver nanowires were formed accompanied by varying degrees of other nanostructures (e.g., nanoparticles). FIG. 4D, by comparison, shows uniform silver nanowires of between 3 and 100 µm long with little or no nanoparticle formation. The yield of the silver nanowires is therefore particularly optimized using TBAC as the additive, with high overall yield and high monodispersity.

The anion (i.e., chloride) in the ionic additive also plays an important role in controlling the nanowire formation. It is found that ionic additives based on other halides (e.g., bromide), do not have the same effect as the chloride-based ionic additive. For example, using cetyl trimethylammonium bromide in the place of cetyl trimethylammonium chloride produces only nanoparticles.

It has been further observed that the concentrations of the constituents in the reaction mixture have a certain impact on the formation of the nanostructures and their yields. For example, the metal salt in the reaction mixture is typically in the range of about 0.01M to 0.2M, more preferably 0.05M to 0.1M, for an optimal yield of nanowires. In addition, the concentration of PVP is typically in the range of 0.01M to 0.2M, more preferably, 0.05M to 0.15M.

In various embodiments, the concentration of the quaternary ammonium chloride in the reaction mixture is in the range of 0.001M to 0.5 M. Preferably, the concentration is less than 0.1M to avoid precipitation. Typically, the relative molar ratio between the quaternary ammonium chloride and the metal salt is about 0.1% to 10%, more preferably, about 0.5% to 1%.

The reaction temperature influences the yields and length of the metal nanowires formed. Typically, the metal salt, PVP, and the ionic additive are mixed in a polyol solvent (e.g., ethylene glycol or propylene glycol) at a first temperature to provide a reaction mixture. The first temperature can be in the range of about 20° C. to 40° C. The reaction mixture is thoroughly mixed before it is heated to a second temperature. The second temperature is typically maintained in a range of about 50° C. to about 200° C., more typically, at about 150° C. to 160° C. At temperatures higher than 170° C., shorter nanowires were formed as compared to the nanowires formed at lower temperatures.

The yield and length of the metal nanowires produced by the modified polyol process are further controlled by the reaction time. FIGS. 5A-5F illustrate a progression of the nanowire formation visualized at ×100 DF. Samples were taken from the reaction mixture at the reaction times indicated. Each sample was cooled in an ice bath to halt the growth of the nanostructures. FIG. 5A shows that within an initial induction period (about 7 minutes), minute particles 40 (e.g., seeds) were formed. As shown in FIGS. 5B-5D, in the next 3 minutes, nanowires 44 rapidly took shape. At 15 minutes into the reaction, longer nanowires 48 populated the reaction mixture (FIG. 5E). Thereafter, an additional 5 minutes yielded more nanowires (FIG. 5F). The reaction was completed within 30 minutes, whereby no more nanowires were formed even with prolonged reaction time.

Figure 6:
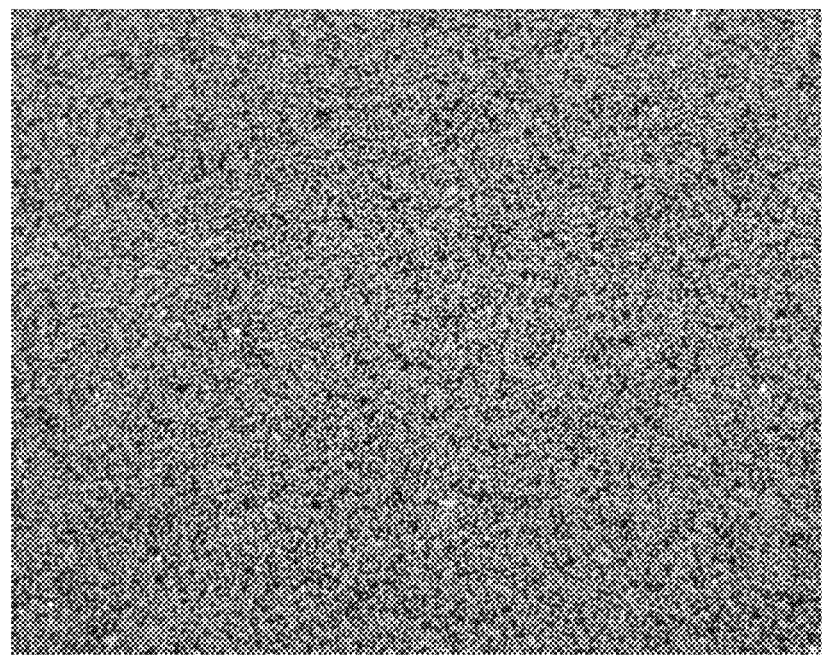
FIG. 6 shows the reaction products of an embodiment in which no ionic additive is present.

FIG. 6 shows a comparative polyol synthesis in ethylene glycol without any ionic additive. As shown, almost no nanowires were formed.

Figure 7:
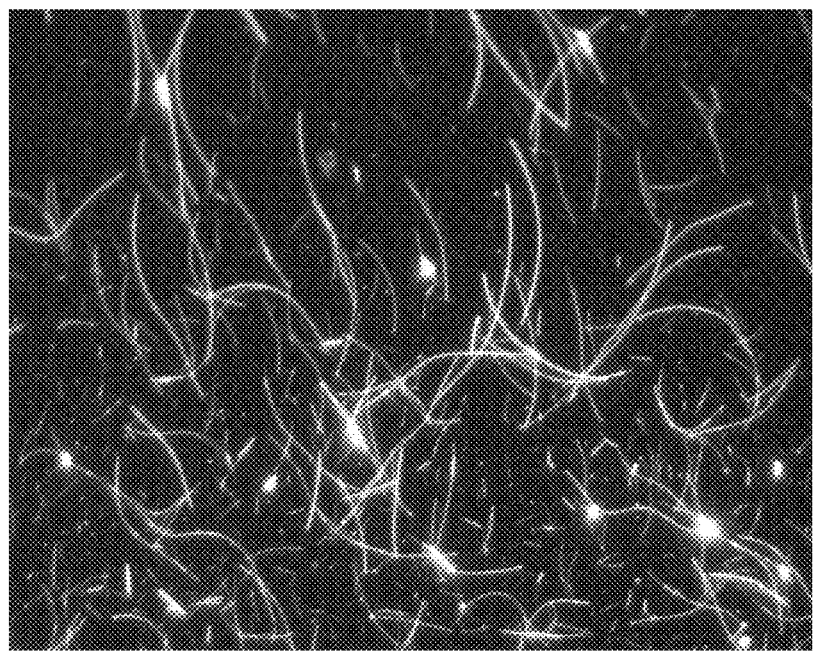
FIG. 7 shows an embodiment in which 1,2-propylene glycol was used as the reducing solvent.
Figure 8:
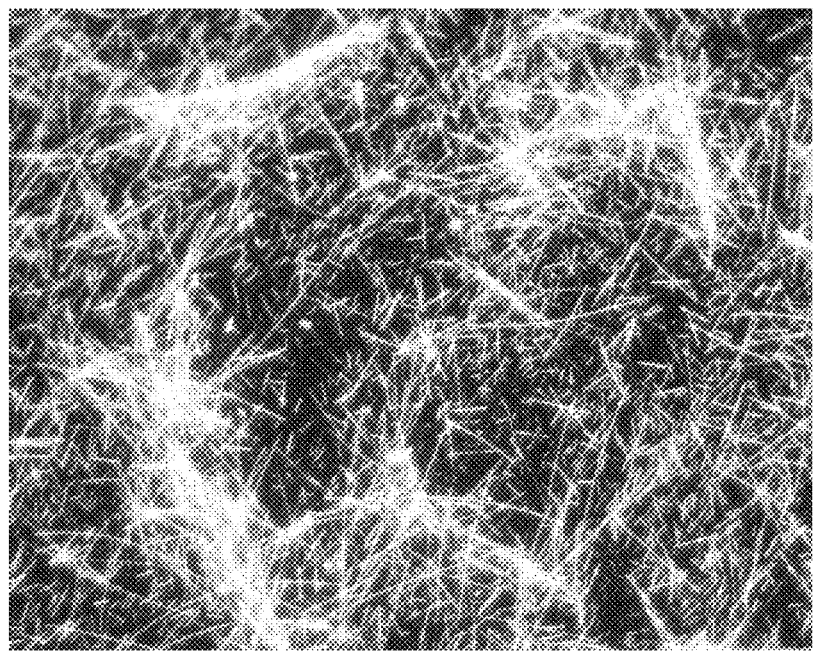
FIG. 8 shows an embodiment in which 1,3-propylene glycol was used as the reducing solvent.

The choice of solvent may also influence the morphologies of the nanowires. For example, 1,2-propylene glycol leads to faster nanowire growth than ethylene glycol while glycerol shows slower reaction rates. FIGS. 7-8 (corresponding to Examples 8 and 9, respectively) show the results of the modified polyol synthesis in 1,2-propylene glycol and 1,3-propylene glycol.

Nitrogen Purge

The above-described standard and modified polyol syntheses are both carried out in the presence of air. Although both processes may be optimized to produce predominantly nanowires, a small but significant population of nanostructures other than nanowires is produced. For example, besides metal nanowires, metal nanostructures of various morphologies, including nanoparticles, nanocubes, nanorods, nanopyramids and multi-ply twinned particles, may also have been obtained. This problem is compounded by poor reproducibility of the process, which results in batch-to-batch variations of nanowire morphologies. This is due, at least in part, to a poor control of the reaction kinetics in the presence of air. For example, in the modified polyol synthesis, the reaction is manually monitored by sampling the reaction mixture and characterizing the nanowire morphologies. The reaction is typically quenched if the nanowire morphologies satisfy certain target criteria with respect to the length and width. However, the visual characterizations of the nanowire morphologies rely on the subjective evaluations of the operator of the reaction, which leads to poor reproducibility in nanowire morphologies and yields from batch to batch. For example, if the reaction is quenched too soon, the target morphology would not have been achieved. If, on the other hand, the reaction is quenched too late, a range of bright objects would form. Once formed, these bright objects are very difficult to separate from the nanowires of desired morphologies due primarily to similarities in mass. As discussed herein, these bright objects, which are typically nanostructures with low aspect ratios, may cause an increase in haze in the final conductive film.

Thus, it has been found that such manual reaction control is less effective in its attempt to reach the target nanowire morphology while reducing the incidence of forming low aspect ratio nanostructures. As a result, the yield of nanowires with target morphologies may vary from batch to batch and may be as low as 25% in some cases.

One embodiment provides a method for controlling nanowire morphologies in a polyol synthesis by purging the reaction vessel with an inert gas prior to the metal salt reduction. Surprisingly, such an inert gas purge reduces or eliminates the batch-to-batch variation of the nanowire morphologies and yields.

More specifically, one embodiment provides a method of preparing metal nanowires comprising:

(a) providing a first reaction mixture by combining a polyol solvent, a capping reagent, and an ionic additive in a reaction vessel;

(b) purging the first reaction mixture with an inert gas for a purging time;

(c) after (b), providing a second reaction mixture by combining the first reaction mixture with a metal salt; and (d) providing a plurality of metal nanostructures by reducing the metal salt, wherein the plurality of metal nanostructures comprise metal nanowires at a first yield.

In a preferred embodiment, the inert gas is nitrogen. It should be understood that where nitrogen purging is described, other inert gas or noble gas such as argon can also be used.

As used herein, "purging" refers to displacing one type of reaction atmosphere with another. In particular, in a polyol synthesis described herein which involves reducing a metal salt in a polyol solvent, purging refers to displacing the air that is present in a reaction vessel with an inert gas prior to the reduction reaction. For example, nitrogen purging may comprise purging the reaction vessel and forming a blanket of inert gas above a top surface of a first reaction mixture comprising all reactants except for the metal salt. In other embodiments, nitrogen purging may comprise sparging the first reaction mixture. As used herein, "sparging" refers to a type of purging that directs the inert air into a liquid phase, e.g., the reaction mixture. Typically, sparging can be carried out by bubbling the inert gas into the reaction mixture.

In some embodiments, prior to purging, the method further comprises heating the first reaction mixture to a predetermined reaction temperature. Typically, the temperature is about 70° C. to 140° C., or preferably 80° C. to 120° C.

In other embodiments, after purging for the initial purging time, the purging continues after the metal salt is added and lasts the entire duration of the reaction.

In various embodiments, the polyol solvent is ethylene glycol, 1,2-propylene glycol, 1,3-propylene glycol, or glycerol. The capping reagent is poly(vinylpyrrolidone) and the ionic additive is a tetraalkylammonium chloride.

In any of the described embodiments, the metal salt is preferably a silver salt and the metal nanowires are silver nanowires.

In various embodiments, the yield of the metal nanowires is at least 80%, more preferably, at least 85%, at least 90% or at least 95%. As used herein, "yield" refers to the amount of the metal nanowires relative to metal added to the reaction mixture in the form of metal salt.

Figure 9A:
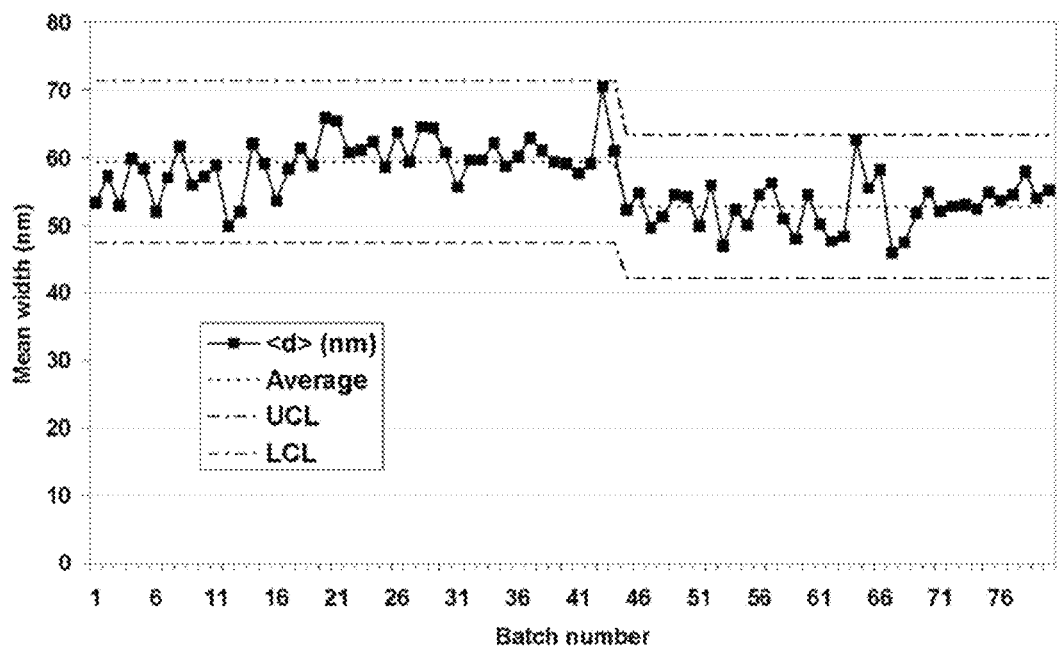
FIG. 9A shows the batch-to-batch variations in mean widths of silver nanowires formed by polyol syntheses and the effect of nitrogen purging.
Figure 9B:
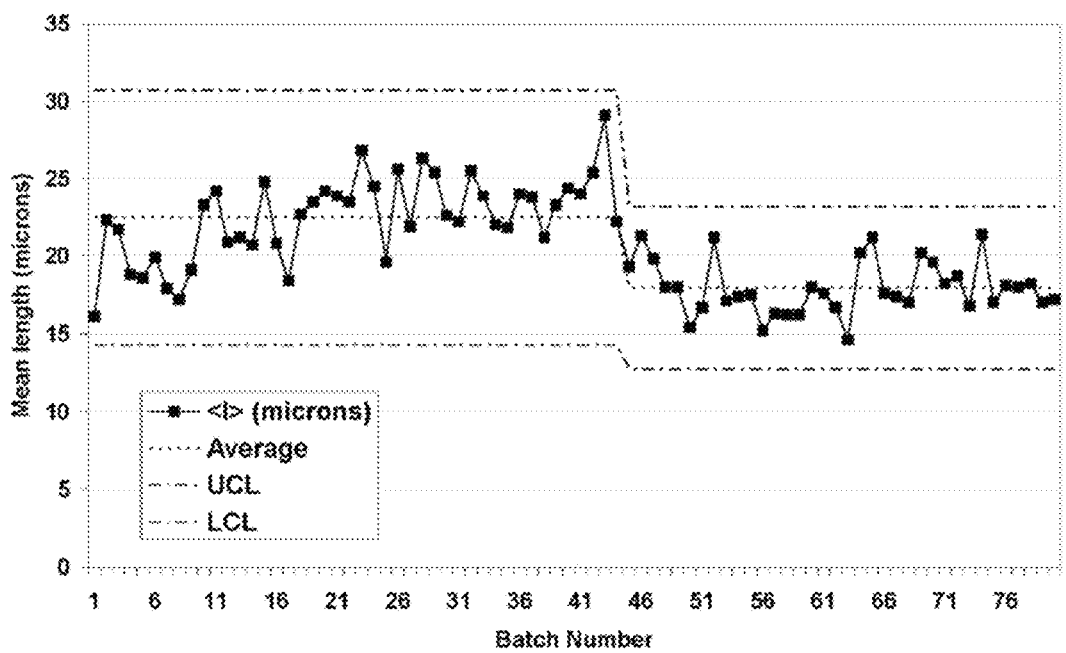
FIG. 9B shows the batch-to-batch variations in mean length of silver nanowires formed by polyol syntheses and the effect of nitrogen purging.
Figure 9C:
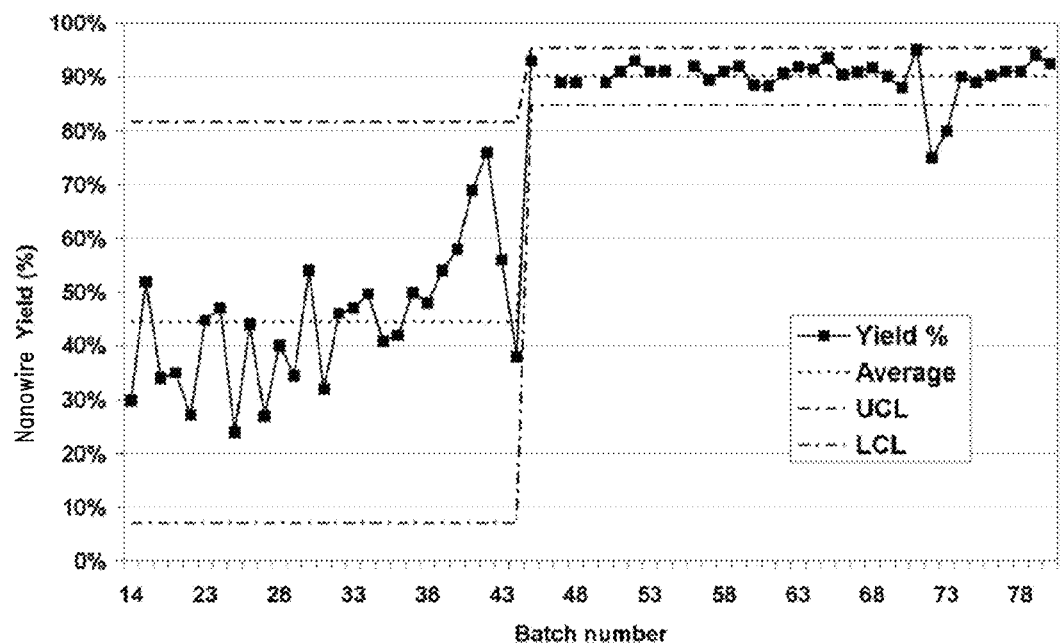
FIG. 9C shows the batch-to-batch variations in yields of silver nanowires formed by polyol syntheses and the effect of nitrogen purging.

FIGS. 9A-9C show the effects of the nitrogen purging in the nanowire morphologies in a number of different reaction batches (80 total). FIG. 9A shows the mean nanowire widths in 40 reaction batches (1-40) without nitrogen purge as well as those in 40 reaction batches (41-80) with nitrogen purge. The upper control limit (UCL) and the lower control limit (LCL) are defined as plus and minus three standard deviations from the average width, respectively. As shown, in the absence of the nitrogen purge, the nanowire widths varied in a larger degree (larger difference between the UCL and LCL) than the variations in the nanowire widths obtained with nitrogen purge. Similarly, FIG. 9B shows the batch-to-batch variations in length are also greatly reduced in the reaction batches with nitrogen purge (41-80) as compared to those in reaction batches without nitrogen purge (1-40). Significantly, FIG. 9C shows that the yields of the nanowires in the reaction batches with nitrogen purge (41-80) are substantially higher and with much less variation as compared to those in the reaction batches without nitrogen purge (1-40).

Figure 9D:
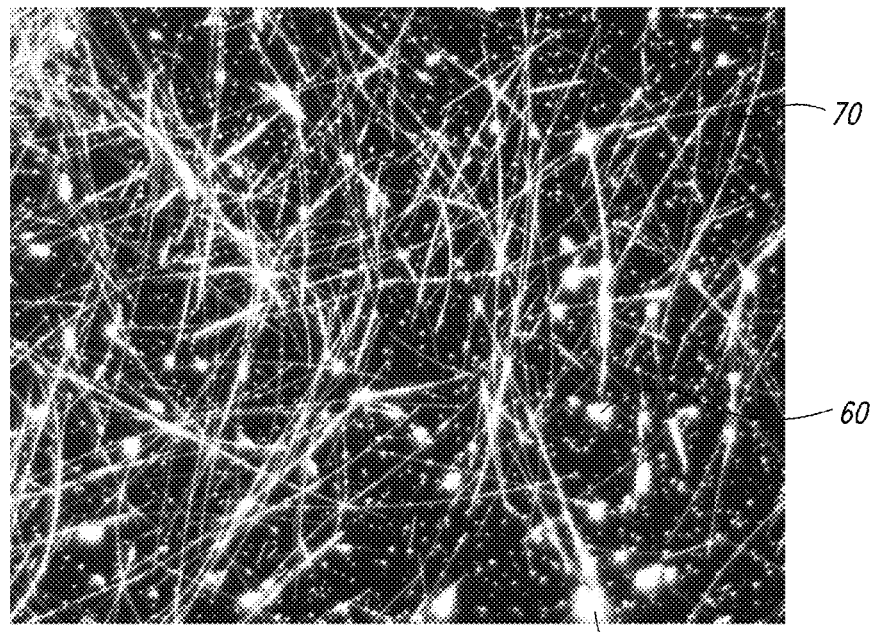
FIG. 9D shows a plurality of nanostructures produced by a polyol synthesis without nitrogen purging.

As a comparison, FIG. 9D shows the collection of nanostructures in a prior art polyol synthesis that was not purged with an inert gas. Instead, the reduction reaction takes place in the presence of air. As shown, bright objects (60), which are short and with relatively low aspect ratios, are frequently present among long and thin nanowires (70). These bright objects would likely result in conductive films with an unacceptably high level of haze.

Thus, it is demonstrated that a polyol synthesis purged with an inert gas, e.g., nitrogen and argon, prior to the reduction reaction, lead to much more reproducible nanowire morphologies, higher yields of nanowires, and fewer nanostructures with low aspect ratios.

Figure 10A:
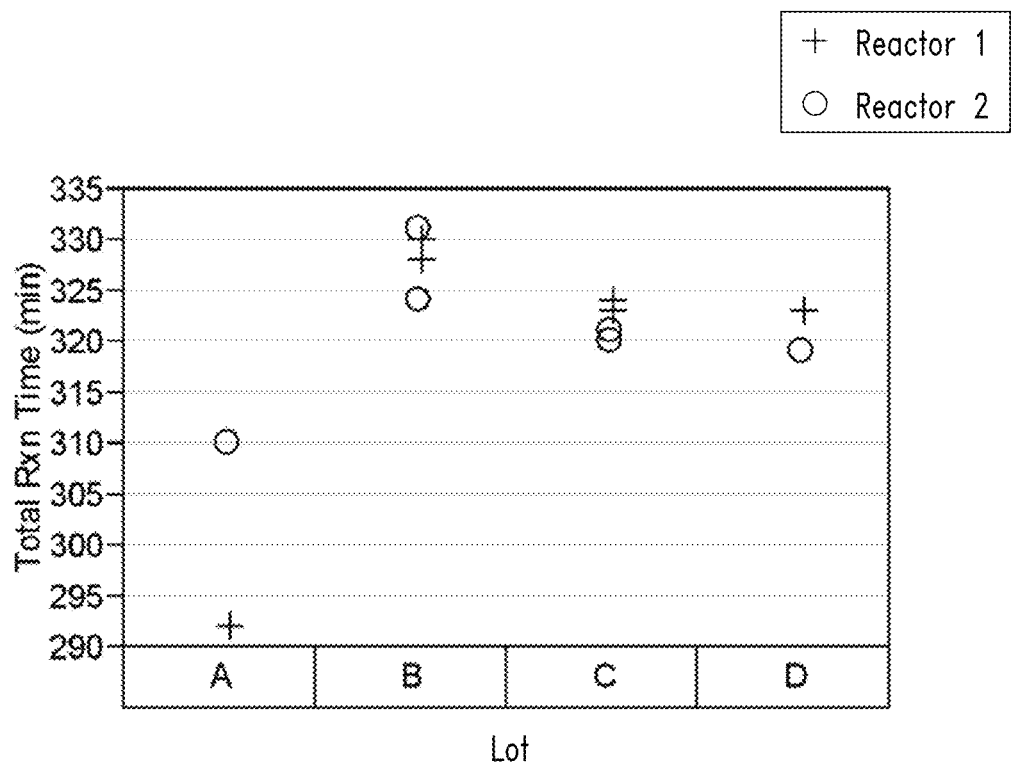
FIG. 10A shows the effects of lot-to-lot variations of propylene glycol on the reaction time of otherwise identical polyol syntheses.

It is further discovered that, even when the inert gas purges for a fixed period of time at a fixed flow rate, the resulting nanowire morphologies could be highly dependent on the particular manufacturer lot of the polyol solvent (e.g., 1,2-propylene glycol, or PG). FIG. 10A shows that in two separate reactors, the total reaction times for reaching the desired nanowire morphologies vary from lot to lot of PG (A-D). Some lots of PG would result in shorter reaction times and shorter and thinner nanowires, while other lots of PG would produce longer nanowires with longer reaction times. See also FIG. 10B.

Figure 10B:
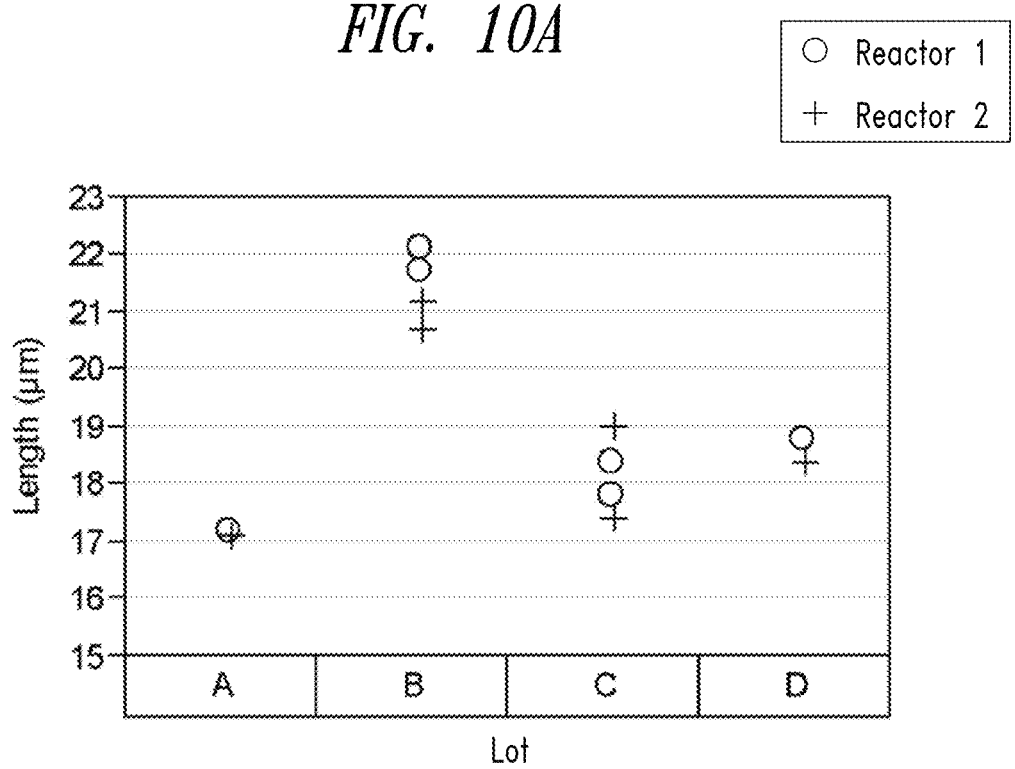
FIG. 10B shows the effects of lot-to-lot variations of propylene glycol on the mean length of the nanowires produced by otherwise identical polyol syntheses.
Figure 10C:
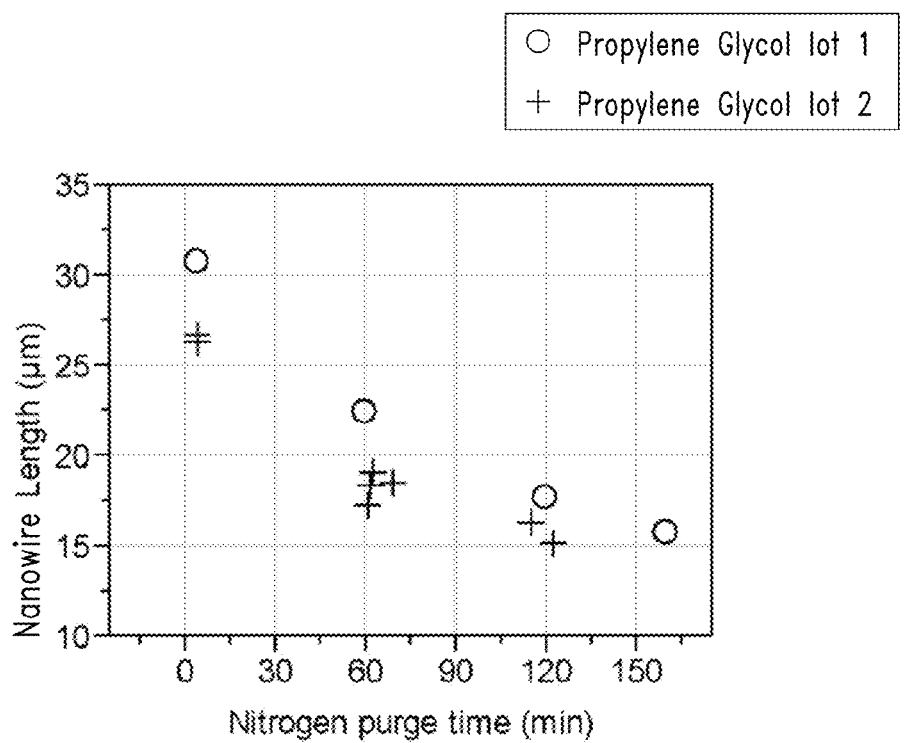
FIG. 10C shows the effects of nitrogen purging time on the mean lengths of silver nanowires produced by a polyol synthesis using a fixed propylene glycol lot.

FIG. 10C shows that for a fixed lot of PG, different nitrogen purging times prior to the addition of the metal salt and subsequent start of the reaction result in different nanowire lengths. In particular, as the purging time increases, shorter but more uniform nanowire lengths were obtained. Thus, in some embodiments, adjusting the length of purging time results in different morphologies of the metal nanostructures. In other embodiments, adjusting the purging time results in a different yield of the metal nanowires.

Figure 11:
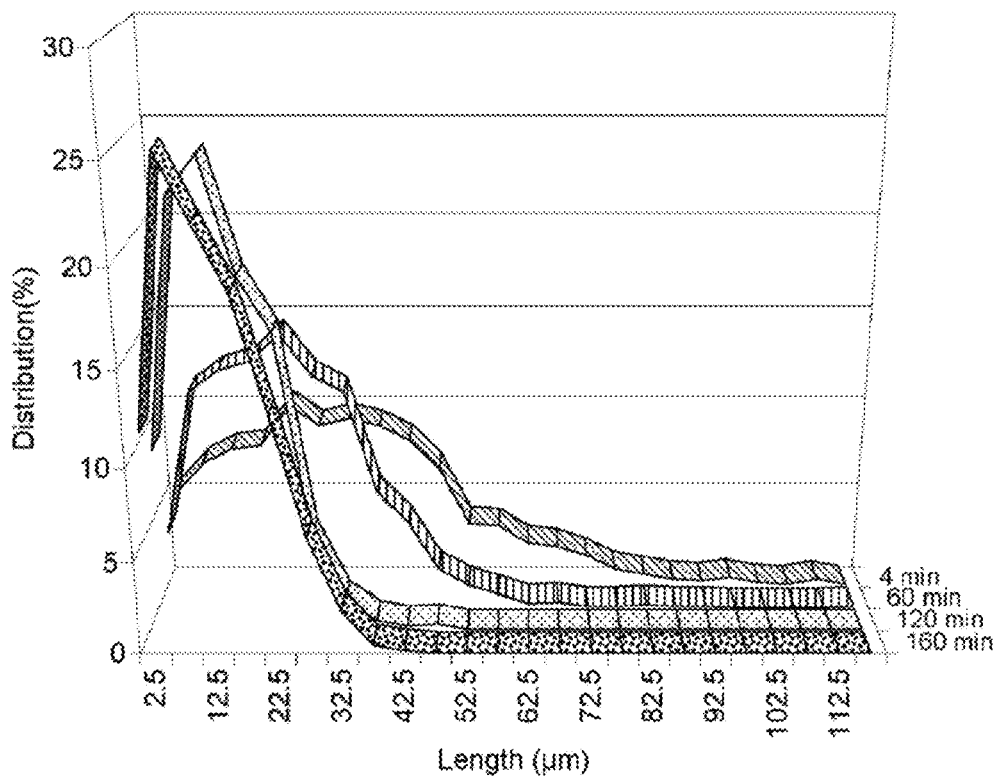
FIG. 11 shows the effects of nitrogen purging times on silver nanowire length distribution for a fixed propylene glycol lot.

FIG. 11 shows that adjusting the purging time also results in different size distributions of the nanowire morphologies. In particular, the longer the purging time, the narrower the length distribution, which may be manipulated to achieve certain target morphologies (e.g., length of about 10 μm).

Thus, another embodiment provides a method of compensating for the lot-to-lot variations of the raw materials of the nanowire synthesis by adjusting the purging times of the inert gas, thereby reducing or eliminating the impact on the nanowire morphologies due to the lot-to-lot variations in the raw materials. The polyol solvent (e.g., PG) is typically a main source of variations because its amount significantly outweighs all the other raw materials. However, any raw material may introduce a certain degree of lot-to-lot variations, which may be similarly addressed by adjusting the inert gas purging time.

More specifically, the method comprises:

(a) providing a first plurality of metal nanowires having a target mean length, a target mean diameter, or a target yield, wherein the first plurality of metal nanowires are prepared in a first polyol solvent by a first polyol synthesis that includes purging with an inert gas for a first purging period, and wherein the first polyol solvent is provided from a first manufacturer lot;

(b) providing a second plurality of metal nanowires having the target mean length, the target mean diameter, or the target yield, wherein the second plurality of metal nanowires are prepared in a second polyol solvent by a second polyol synthesis that includes purging with an inert gas for a second purging period, and wherein the second polyol solvent is chemically identical to the first polyol solvent and is provided from a second manufacturer lot, wherein the first purging period differs from the second purging period.

In various embodiments, the first polyol synthesis and the second polyol synthesis are otherwise carried out in substantially the same conditions.

Typically, a target morphology of the metal nanowires can be pre-selected in order to satisfy certain specifications of the transparent conductors formed of the metal nanowires. For example, co-owned and co-pending U.S. application Ser. No. 11/871,053 provides a detailed analysis of the correlation between nanowire morphology and sheet resistance in nanowire-based transparent conductors, which application is incorporated herein by reference in its entirety.

The first and second polyol solvents are chemically identical in that they have the same chemical characteristics and properties. They only differ from each other to the extent of the lot-to-lot variations that may arise from varying degrees of the impurities and dissolved oxygen levels in any given manufacturer lot. For example, as shown in FIGS. 10A and 10B, lots A-D were propylene glycol supplied by the same manufacturer (Dow Chemical Company, Midland, Mich.), yet they produced nanowires of different morphologies from identically run reactions.

A further embodiment provides a method of achieving a target nanowire morphology by running one or more test polyol syntheses in the second polyol solvent to determine the length of purging time. In particular, smaller reaction scales can be initially run for the second polyol solvent of the second lot, in which the only variables are purging times, and the nanowires produced can be analyzed. The purging time that is associated with nanowires of the target morphologies can be used in running a large scale reaction.

Ink Compositions

To prepare a nanostructure network layer, a liquid dispersion of the nanostructures can be deposited on a substrate, followed by a drying or curing process. The liquid dispersion is also referred to as an "ink composition" or "ink formulation." The ink composition typically comprises a plurality of nanostructures and a liquid carrier.

Because anisotropic nanostructures of high aspect ratio (e.g., greater than 10) promote the formation of an efficient conductive network, it is desirable that the nanostructures of the ink composition uniformly have aspect ratios of greater than 10 (e.g., nanowires). However, in certain embodiments, a relatively small amount of nanostructures with aspect ratios of 10 or less (including nanoparticles), as a by-product of the nanowire synthesis, may be present. Thus, unless otherwise specified, conductive nanostructures should be understood to be inclusive of nanowires and nanoparticles. Further, as used herein, unless specified otherwise, "nanowires," which represent the majority of the nanostructures in the ink composition and the conductive film based on the same, may or may not be accompanied by a minor amount of nanoparticles or other nanostructures having aspect ratios of 10 or less.

The liquid carrier can be any suitable organic or inorganic solvent or solvents, including, for example, water, a ketone, an alcohol, or a mixture thereof. The ketone-based solvent can be, for example, acetone, methylethyl ketone, and the like. The alcohol-based solvent can be, for example, methanol, ethanol, isopropanol, ethylene glycol, diethylene glycol, triethylene glycol, propylene glycol, and the like.

The ink composition may further include one or more agents that prevent or reduce aggregation or corrosion of the nanostructures, and/or facilitate the immobilization of the nanostructures on the substrate. These agents are typically non-volatile and include surfactants, viscosity modifiers, corrosion inhibitors, and the like.

In certain embodiments, the ink composition includes surfactants, which serve to reduce aggregation of the nanostructures. Representative examples of suitable surfactants include fluorosurfactants such as ZONYL® surfactants, including ZONYL® FSN, ZONYL® FSO, ZONYL® FSA, ZONYL® FSH (DuPont Chemicals, Wilmington, Del.), and NOVEC™ (3M, St. Paul, Minn.). Other exemplary surfactants include non-ionic surfactants based on alkylphenol ethoxylates. Preferred surfactants include, for example, octylphenol ethoxylates such as TRITON™ (×100, ×114, ×45), and nonylphenol ethoxylates such as TERGITOL™ (Dow Chemical Company, Midland Mich.). Further exemplary non-ionic surfactants include acetylenic-based surfactants such as DYNOL® (604, 607) (Air Products and Chemicals, Inc., Allentown, Pa.) and n-dodecyl β-D-maltoside.

In certain embodiments, the ink composition includes one or more viscosity modifiers, which serve as a binder that immobilizes the nanostructures on a substrate. Examples of suitable viscosity modifiers include hydroxypropyl methylcellulose (HPMC), methyl cellulose, xanthan gum, polyvinyl alcohol, carboxy methyl cellulose, and hydroxy ethyl cellulose.

In particular embodiments, the ratio of the surfactant to the viscosity modifier is preferably in the range of about 80 to about 0.01; the ratio of the viscosity modifier to the metal nanowires is preferably in the range of about 5 to about 0.000625; and the ratio of the metal nanowires to the surfactant is preferably in the range of about 560 to about 5. The ratios of components of the ink composition may be modified depending on the substrate and the method of application used. The preferred viscosity range for the ink composition is between about 1 and 100 cP.

Conductive Films

A nanostructure network layer is formed following the ink deposition and after the liquid carrier is at least partially dried or evaporated. The nanostructure network layer thus comprises nanostructures that are randomly distributed and interconnect with one another. The nanostructure network layer often takes the form of a thin film that typically has a thickness comparable to that of a diameter of the conductive nanostructure. As the number of the nanostructures reaches the percolation threshold, the thin film is electrically conductive and is referred to as a "conductive film." Other non-volatile components of the ink composition, including, for example, one or more surfactants and viscosity modifiers, may form part of the conductive film. Thus, unless specified otherwise, as used herein, "conductive film" refers to a nanostructure network layer formed of networking and percolative nanostructures combined with any of the non-volatile components of the ink composition, and may include, for example, one or more of the following: viscosity modifier, surfactant, and corrosion inhibitor. In certain embodiments, a conductive film may refer to a composite film structure that includes said nanostructure network layer and additional layers such as an overcoat or barrier layer.

Typically, the longer the nanostructures, the fewer nanostructures are needed to achieve percolative conductivity. For anisotropic nanostructures, such as nanowires, the electrical percolation threshold or the loading density is inversely related to the length$^2$ of the nanowires. Co-pending and co-owned U.S. patent application Ser. No. 11/871,053, which is incorporated herein by reference in its entirety, describes in detail the theoretical, as well as empirical, relationship between the sizes/shapes of the nanostructures and the surface loading density at the percolation threshold.

The electrical conductivity of the conductive film is often measured by "film resistivity" or "sheet resistance," which is represented by ohm/square (or "$\Omega/\square$"). The film resistance is a function of at least the surface loading density, the size/shapes of the nanostructures, and the intrinsic electrical property of the nanostructure constituents. As used herein, a thin film is considered conductive if it has a sheet resistance of no higher than $10^8 \Omega/\square$. Preferably, the sheet resistance is no higher than $10^4 \Omega/\square$, $3,000\Omega/\square$, $1,000\Omega/\square$, or $100\Omega/\square$. Typically, the sheet resistance of a conductive network formed by metal nanostructures is in the ranges of from $10\Omega/\square$ to $1000\Omega/\square$, from $100\Omega/\square$ to $750\Omega/\square$, from $50\Omega/\square$ to $200\Omega/\square$, from $100\Omega/\square$ to $500\Omega/\square$, from $100\Omega/\square$ to $250\Omega/\square$, from $10\Omega/\square$ to $200\Omega/\square$, from $10\Omega/\square$ to $50\Omega/\square$, or from $1\Omega/\square$ to $10\Omega/\square$.

Optically, the conductive film can be characterized by "light transmission" as well as "haze." Transmission refers to the percentage of an incident light transmitted through a medium. The incident light refers to ultra-violet (UV) or visible light having a wavelength between about 250 nm to 800 nm. In various embodiments, the light transmission of the conductive film is at least 50%, at least 60%, at least 70%, at least 80%, at least 85%, at least 90%, or at least 95%. The conductive film is considered "transparent" if the light transmission is at least 85%. Haze is an index of light diffusion. It refers to the percentage of the quantity of light separated from the incident light and scattered during transmission (i.e., transmission haze). Unlike light transmission, which is largely a property of the medium (e.g., the conductive film), haze is often a production concern and is typically caused by surface roughness and embedded particles or compositional heterogeneities in the medium. In various embodiments, the haze of the transparent conductor is no more than 10%, no more than 8%, no more than 5%, or no more than 1%.

The overcoat, with or without a corrosion inhibitor, also forms a physical barrier to protect the nanowire layer from the impacts of temperature and humidity, and any fluctuation thereof, which can occur during a normal operative condition of a given device. The overcoat can be one or more of a hard coat, an anti-reflective layer, a protective film, a barrier layer, and the like, all of which are extensively discussed in co-pending U.S. patent application Ser. Nos. 11/871,767 and 11/504,822. Examples of suitable overcoats include synthetic polymers such as polyacrylics, epoxy, polyurethanes, polysilanes, silicones, poly(silico-acrylic), and so on. Suitable anti-glare materials are well known in the art, including, without limitation, siloxanes, polystyrene/PMMA blend, lacquer (e.g., butyl acetate/nitrocellulose/wax/alkyd resin), polythiophenes, polypyrroles, polyurethane, nitrocellulose, and acrylates, all of which may comprise a light diffusing material such as colloidal or fumed silica. Examples of protective films include, but are not limited to: polyester, polyethylene terephthalate (PET), acrylate (AC), polybutylene terephthalate, polymethyl methacrylate (PMMA), acrylic resin, polycarbonate (PC), polystyrene, triacetate (TAC), polyvinyl alcohol, polyvinyl chloride, polyvinylidene chloride, polyethylene, ethylene-vinyl acetate copolymers, polyvinyl butyral, metal ion-crosslinked ethylene-methacrylic acid copolymers, polyurethane, cellophane, polyolefins, or the like; particularly preferable are AC, PET, PC, PMMA, or TAC.

The various embodiments described herein are further illustrated by the following non-limiting examples.

EXAMPLES

Example 1

Modified Polyol Process—Microscale

In a 10 ml vial, 0.5 ml solution of $AgNO_3$ in ethylene glycol (0.1M) was combined with 0.5 ml solution of PVP in ethylene glycol (0.15M) and 0.5 ml solution of tetrabutylammonium chloride in ethylene glycol (0.001M) at room temperature (25° C.). The vial was dipped into an oil bath (190° C.) for 20-30 minutes for the reaction to complete. Grey and iridescent reaction products were obtained. Visualization under a microscope (×100 DF) indicated uniform nanowires were formed.

The reaction products were allowed to settle to the bottom of the vial and the ethylene glycol was removed. The reaction products were dried, and the reaction products were then re-suspended in 5 ml deionized water. The suspension was filtered through a glass frit (Fine, 4-6 μm, Kontes). The retentate (containing nanowires which could not filter through the frit) were dried and weighed.

Further analysis of the reaction products indicated that they were substantially nanowires, with no or very few nanoparticles.

The silver nanowires produced had a mean diameter of 75±8 nm, and an average length of 9.7±2.6 μm.

The microscale reaction described herein was highly reproducible which consistently yielded a high percentage of silver nanowires.

Example 2

Without Ionic Additive

As a comparison, the reaction of Example 1 was carried out without the tetrabutylammonium chloride additive. As shown in FIG. 6, only nanoparticles were obtained.

Example 3

Modified Polyol Process—Large-Scale

In a 1000 ml flask, 4.171 g PVP (MW=50,000, 37.6 mmol), 70 mg tetrabutylammonium chloride (0.25 mmol), and 4.254 g AgNO$_3$ (25 mmol) were mixed in 500 ml ethylene glycol. The reaction mixture was stirred at room temperature (25° C.) for 15 minutes before the flask was heated with a heating mantle set to 200° C. The internal temperature of the reaction mixture was controlled at about 150° C. Within 30 minutes, the reaction mixture turned into a grey and iridescent suspension of silver nanowires. The silver nanowires produced had a mean diameter of 62±7 nm, and an average length of 8.5±1.9 μm. There were no precipitate or nanoparticles formed (see, e.g., FIG. 4D).

The large-scale reaction described herein was highly reproducible.

Example 4

Comparative Result—Standard Polyol Process

For comparison purposes, silver nanowires were also prepared according to the method described in U.S. Published Patent Application No. 2005/0056118. More specifically, 5 ml ethylene glycol was preheated at 160° C. 3 ml of AgNO$_3$ solution in ethylene glycol (0.085M) and 3 ml of PVP solution in ethylene glycol (0.13M) were simultaneously added to the preheated ethylene glycol. The reaction mixture was heated and maintained at 160° C. for 40 minutes. The resulting products were observed as a mixture of nanowires and nanoparticles, shown in FIG. 2.

Example 5

Modified Polyol Process—Large-Scale

In a 5000 ml flask, 49.98 g PVP (MW=50,000, 450 mmol), 0.84 g tetrabutylammonium chloride (3 mmol), and 51.02 g AgNO$_3$ (300 mmol) were mixed in 3000 ml ethylene glycol. The PVP was thoroughly dispersed in about ⅓ of the ethylene glycol with a high shear mixer before being added into the reaction flask. The reaction mixture was stirred at room temperature (25° C.) for 15 minutes before the flask was heated with a heating mantle set to 200° C. The internal temperature of the reaction mixture was controlled at about 140° C. Within 30 minutes, the reaction mixture turned into a grey and iridescent suspension of silver nanowires. The silver nanowires produced had a mean diameter of 82.6±22.3 nm, and an average length of 14.1±8.1 μm. There were few nanoparticles formed.

The large-scale reaction described herein was highly reproducible.

Example 6

Modified Polyol Process—Lower Temperature

In a 100 ml flask, 0.42 g PVP (MW=50,000, 3.76 mmol), 0.07 ml tetrabutylammonium chloride (0.25 mmol), and 0.43 g AgNO$_3$ (2.5 mmol) were mixed in 50 ml ethylene glycol. The reaction mixture was stirred at room temperature (25° C.) for 15 minutes before the flask was heated in an oven set to 80° C. without stirring. Within 2 weeks, the reaction mixture turned into a grey and iridescent suspension of silver nanowires. The silver nanowires produced had a mean diameter of 62±18 nm, and an average length of 43±20 μm. The reaction products were predominantly long, thin nanowires.

Example 7

Modified Polyol Process—1,3-Propylene Glycol Solvent

In a 1000 ml flask, 4.17 g PVP (MW=50,000, 37.6 mmol), 72 mg tetrabutylammonium chloride (0.25 mmol), and 4.25 g AgNO$_3$ (25 mmol) were mixed in 500 ml 1,2-propylene glycol. The reaction mixture was stirred at room temperature (25° C.) for 15 minutes before the flask was heated with a heating mantle set to 200° C. The internal temperature of the reaction mixture was controlled at about 160° C. Within 30 minutes, the reaction mixture turned into a grey and iridescent suspension of silver nanowires. The reaction products were predominantly nanowires.

Example 8

Modified Polyol Process—1,2-Propylene Glycol Solvent

In a 1000 ml flask, 0.417 g PVP (MW=50,000, 3.76 mmol), 7.2 mg tetrabutylammonium chloride (0.025 mmol), and 0.425 g AgNO$_3$ (2.5 mmol) were mixed in 50 ml 1,2-propylene glycol. The reaction mixture was stirred at room temperature (25° C.) for 15 minutes before the flask was heated with a heating mantle set to 81° C. Within 2 days, the reaction mixture turned into a grey and iridescent suspension of silver nanowires. The reaction products were predominantly nanowires as shown in FIG. 7.

Example 9

Modified Polyol Process—1,3-Propylene Glycol Solvent

In a 100 ml flask, 0.42 g PVP (MW=50,000, 3.76 mmol), 0.07 ml tetrabutylammonium chloride (0.25 mmol), and 0.43 g AgNO$_3$ (2.5 mmol) were mixed in 50 ml 1,3-propylene glycol. The reaction mixture was stirred at room temperature (25° C.) for 15 minutes before the flask was heated in an oven set to 100° C. without stirring. Within 12 hours, the reaction mixture turned into a grey and iridescent suspension of silver nanowires. The reaction products were predominantly nanowires as shown in FIG. 8.

Example 10

Nitrogen Purge and Sparge

Figure 12A:
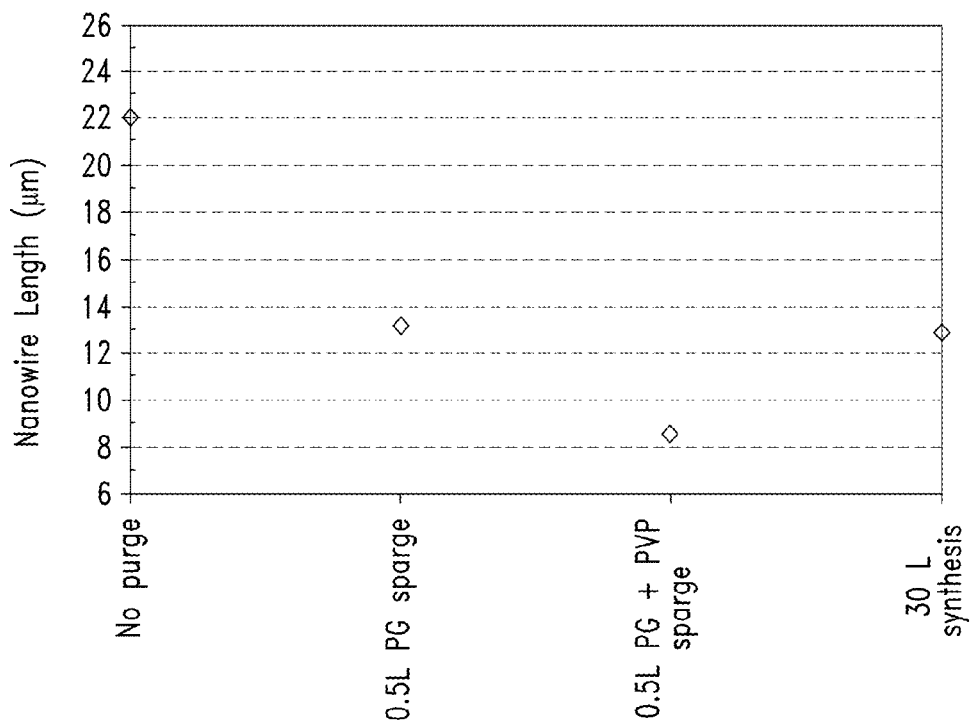
FIG. 12A shows the effects of nitrogen purging or sparging on the mean length of silver nanowires produced by a polyol synthesis.
Figure 12B:
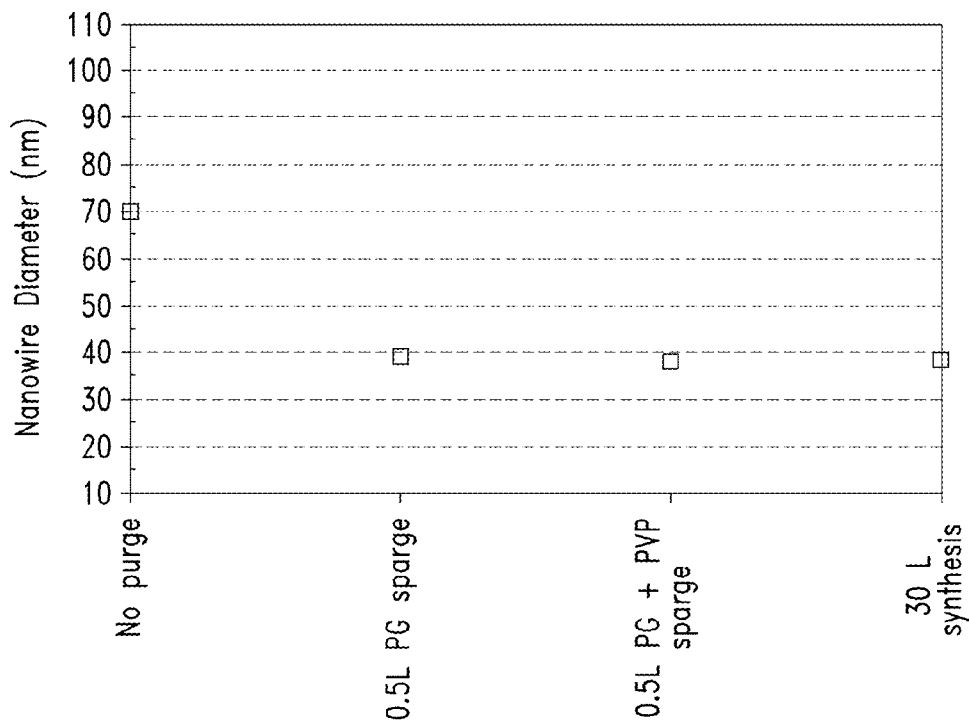
FIG. 12B shows the effects of nitrogen purging or sparging on the mean width of silver nanowires produced by a polyol synthesis.

FIGS. 12A and 12B further show the strong correlations between purging or sparging nanowire reaction mixture with nitrogen. More specifically, two small scale reactions (0.5 L PG) were carried out in which either PG was sparged or both PG and the PVP were sparged with nitrogen prior to the addition of the metal salt (silver nitrate). The reaction conditions were otherwise identical and both were subjected to a full nitrogen purge during the entire process. The resulting nanowire morphologies were comparable to each other and comparable to the scaled-up reaction (30 L). All reactions with nitrogen purge/sparge resulted in dramatically different morphologies from those produced by synthesis with no nitrogen purge.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of preparing metal nanowires comprising:
   (a) providing a first reaction mixture by combining a polyol solvent, a capping reagent, and an ionic additive in a reaction vessel;
   (b) purging the first reaction mixture with an inert gas for a purging time;
   (c) after (b), providing a second reaction mixture by combining the first reaction mixture with a metal salt; and
   (d) providing a plurality of metal nanostructures by reducing the metal salt, wherein the plurality of metal nanostructures comprise metal nanowires at a first yield.

2. The method of claim 1, further comprising heating the first reaction mixture to a reaction temperature prior to (b).

3. The method of claim 1 wherein purging the first reaction mixture includes purging the reaction vessel and forming a blanket of inert gas above a top surface of the first reaction mixture.

4. The method of claim 1 wherein purging the first reaction mixture includes sparging the first reaction mixture.

5. The method of claim 1 wherein providing the plurality of metal nanostructures includes reducing the metal salt while purging the second reaction mixture.

6. The method of claim 1 wherein the polyol solvent is ethylene glycol, 1,2-propylene glycol, 1,3-propylene glycol, or glycerol.

7. The method of claim 6 wherein the capping reagent is poly(vinylpyrrolidone).

8. The method of claim 7 wherein the ionic additive provides a chloride ion.

9. The method of claim 8 wherein the ionic additive is a tetraalkylammonium chloride.

10. The method of claim 6 wherein the metal salt is a silver salt and the metal nanowires are silver nanowires.

11. The method of claim 1 wherein the plurality of metal nanostructures includes at least 80% of metal nanowires.

12. The method of claim 1 further comprising adjusting the purging time to provide different morphologies of the metal nanostructures.

13. The method of claim 1 further comprising adjusting the purging time to provide a different yield of the metal nanowires.

* * * * *